US012532553B2

(12) United States Patent
Tsukada et al.

(10) Patent No.: US 12,532,553 B2
(45) Date of Patent: Jan. 20, 2026

(54) LIGHT DETECTION DEVICE

(71) Applicant: HAMAMATSU PHOTONICS K.K., Hamamatsu (JP)

(72) Inventors: Yoshinori Tsukada, Hamamatsu (JP); Kohei Kasamori, Hamamatsu (JP); Masaki Hirose, Hamamatsu (JP); Yoshihisa Warashina, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 434 days.

(21) Appl. No.: 18/017,866

(22) PCT Filed: Jul. 7, 2021

(86) PCT No.: PCT/JP2021/025646
§ 371 (c)(1),
(2) Date: Jan. 25, 2023

(87) PCT Pub. No.: WO2022/044556
PCT Pub. Date: Mar. 3, 2022

(65) Prior Publication Data
US 2023/0327039 A1    Oct. 12, 2023

(30) Foreign Application Priority Data

Aug. 26, 2020  (JP) ................. 2020-142572

(51) Int. Cl.
*H10F 30/225*  (2025.01)
*H10F 77/30*  (2025.01)

(52) U.S. Cl.
CPC ......... *H10F 30/225* (2025.01); *H10F 77/334* (2025.01)

(58) Field of Classification Search
CPC .. H10F 30/225; H10F 30/2255; H10F 77/334; H10F 77/407; H10F 77/50;
(Continued)

(56) References Cited

U.S. PATENT DOCUMENTS 4,282,290 A    8/1981  Pellicori et al.
4,785,338 A   11/1988  Kinoshita et al.
(Continued)

FOREIGN PATENT DOCUMENTS

CN    102844890 A    12/2012
JP    S56-024969 A    3/1981
(Continued)

OTHER PUBLICATIONS

International Preliminary Report on Patentability mailed Mar. 9, 2023 for PCT/JP2021/025646.
"Back-illuminated sensor", Sep. 27, 2019, XP093169298.

*Primary Examiner* — Sitaramarao S Yechuri
(74) *Attorney, Agent, or Firm* — Faegre Drinker Biddle & Reath LLP (57) ABSTRACT

A photodetection device includes a photodetection element and a package. The photodetection element includes a semiconductor substrate and a light absorption film. The light absorption film is provided on a region of at least a part of a region around a photodetection region on a principal surface of the semiconductor substrate. The light absorption film has a multi-layer structure including a light absorption layer, a resonance layer, and a reflection layer. At a wavelength of detection target light, a light transmittance inside the resonance layer is larger than a light transmittance inside the light absorption layer, and a light reflectance on a surface of the reflection layer is larger than a light reflectance on a surface of the resonance layer.

10 Claims, 8 Drawing Sheets

(58) Field of Classification Search
CPC ...... G01J 1/0214; G01J 1/0271; G01J 1/0437; G01J 1/0204; G01J 1/42; G01J 5/024; G01J 5/045; G01J 5/06; G01J 5/0831; G01J 5/0853; G01J 2001/446; G01J 1/4466

See application file for complete search history.

(56) References Cited

U.S. PATENT DOCUMENTS

| | | | | |
|---|---|---|---|---|
| 5,034,606 | A | * | 7/1991 | Ohkubo ............ G01J 1/08 250/252.1 |
| 6,043,550 | A | * | 3/2000 | Kuhara ............ H10F 77/331 257/233 |
| 6,075,237 | A | * | 6/2000 | Ciccarelli ............ H10F 77/50 257/E31.118 |
| 2004/0029366 | A1 | | 2/2004 | Jakoby |
| 2004/0129991 | A1 | * | 7/2004 | Lai ............ H10F 30/223 257/433 |
| 2010/0019340 | A1 | * | 1/2010 | Shibayama ............ H10F 39/806 257/434 |
| 2012/0156714 | A1 | * | 6/2012 | O'Brien ............ G01N 21/6428 435/29 |
| 2013/0099100 | A1 | | 4/2013 | Pavlov |
| 2017/0153045 | A1 | * | 6/2017 | Chung ............ F24S 70/20 |

FOREIGN PATENT DOCUMENTS

| | | |
|---|---|---|
| JP | H10-153704 A | 6/1998 |
| JP | 2011-253987 A | 12/2011 |
| TW | I615985 A | 2/2018 |

* cited by examiner

LIGHT DETECTION DEVICE

TECHNICAL FIELD

The present disclosure relates to a photodetection device.

BACKGROUND ART

Patent Document 1 discloses a technique related to a silicon photomultiplier (SiPM). The SiPM includes a plurality of cells each including an avalanche photodiode.

CITATION LIST

Patent Literature

Patent Document 1: US Patent Application Publication No. 2013/0099100

SUMMARY OF INVENTION

Technical Problem

A photodetection device is used in which a semiconductor photodetection element having a photodetection region such as a photodiode being formed on a surface of a semiconductor substrate is contained in a package having an optical window. In the photodetection device of the above configuration, when detection target light enters the package, a part of the light reaches a periphery of the photodetection region, and is scattered in the package. Further, the light is incident on the photodetection region with a time interval from the incidence into the package.

The above behavior of the detection target light causes the following problem. That is, compared to the detection target light which reaches the photodetection region immediately after entering the package, the detection target light which reaches the photodetection region after being scattered in the package causes a delay in absorption timing in the photodetection region. Thus, a waveform of a detection signal obtained by amplifying a charge output from the photodetection region is temporally expanded, leading to a decrease in temporal resolution. Therefore, in order to improve the temporal resolution of the semiconductor photodetection element, it is desirable to reduce light scattered in the package.

An object of the present invention is to provide a photodetection device capable of reducing light scattered in a package.

Solution to Problem

An embodiment of the present invention is a photodetection device. The photodetection device includes a semiconductor photodetection element including a semiconductor substrate having a first surface on which detection target light is incident, and a second surface opposite to the first surface, and including a photodetection region on the first surface side for generating a charge in an amount according to a light intensity of the detection target light, and a light absorption film provided on a region of at least a part of a region around the photodetection region on the first surface; and a package having an optical window through which the detection target light passes, and for containing the semiconductor photodetection element, and the light absorption film has a multi-layer structure including a light absorption layer, a resonance layer provided between the light absorption layer and the semiconductor substrate, and a reflection layer being a metal layer provided between the resonance layer and the semiconductor substrate, and at a wavelength of the detection target light, a light transmittance inside the resonance layer is larger than a light transmittance inside the light absorption layer, and a light reflectance on a surface of the reflection layer is larger than a light reflectance on a surface of the resonance layer.

An embodiment of the present invention is a photodetection device. The photodetection device includes a semiconductor photodetection element including a semiconductor substrate having a first surface, and a second surface opposite to the first surface and on which detection target light is incident, and including a photodetection region on the first surface for generating a charge in an amount according to a light intensity of the detection target light, and a light absorption film provided on a region of at least a part of a region around a region obtained by projecting the photodetection region on the second surface in a direction opposite to an incident direction of the detection target light; and a package having an optical window through which the detection target light passes, and for containing the semiconductor photodetection element, and the light absorption film has a multi-layer structure including a light absorption layer, a resonance layer provided between the light absorption layer and the semiconductor substrate, and a reflection layer being a metal layer provided between the resonance layer and the semiconductor substrate, and at a wavelength of the detection target light, a light transmittance inside the resonance layer is larger than a light transmittance inside the light absorption layer, and a light reflectance on a surface of the reflection layer is larger than a light reflectance on a surface of the resonance layer.

In the above photodetection device, the detection target light passing through the optical window is incident on the photodetection region of the semiconductor substrate. Further, a charge of an amount according to the light intensity of the detection target light being incident on the photodetection region is generated in the photodetection region. Thus, an incident light amount of the detection target light can be electrically detected. However, a part of the detection target light passing through the optical window is directed to the region around the photodetection region rather than the photodetection region. The above part of the detection target light reaches the light absorption film provided on the region of at least a part of the region around the photodetection region on the first surface (or the region on the second surface obtained by projecting the photodetection region on the first surface in the direction opposite to the incident direction of the detection target light).

The light absorption film has the multi-layer structure including the light absorption layer, the resonance layer, and the reflection layer. A part of the light incident on the light absorption film is immediately absorbed in the light absorption layer. Light which is not absorbed by the light absorption layer passes through the light absorption layer and enters the resonance layer. Further, the light entering the resonance layer is gradually absorbed by the light absorption layer while being multiply reflected between an interface between the light absorption layer and the resonance layer and an interface between the resonance layer and the reflection layer.

Thus, according to the above light absorption film, extremely high absorption efficiency can be realized as compared with a light absorption film formed of a single layer. Therefore, according to the above photodetection device, it is possible to effectively reduce the reflection of the detection target light in the region around the photodetection region on the first surface (or the region on the second surface obtained by projecting the photodetection region on the first surface in the direction opposite to the incident direction of the detection target light), and thus, it is possible to reduce light scattered in the package and suppress a decrease in temporal resolution of the semiconductor photodetection element.

Advantageous Effects of Invention

According to the photodetection device of the embodiment of the present invention, it is possible to reduce light being scattered in a package.

DESCRIPTION OF EMBODIMENTS

Hereinafter, embodiments of a photodetection device will be described in detail with reference to the accompanying drawings. In the description of the drawings, the same elements will be denoted by the same reference signs, and redundant description will be omitted.

The present invention is not limited to these examples.

FIRST EMBODIMENT

Figure 1:
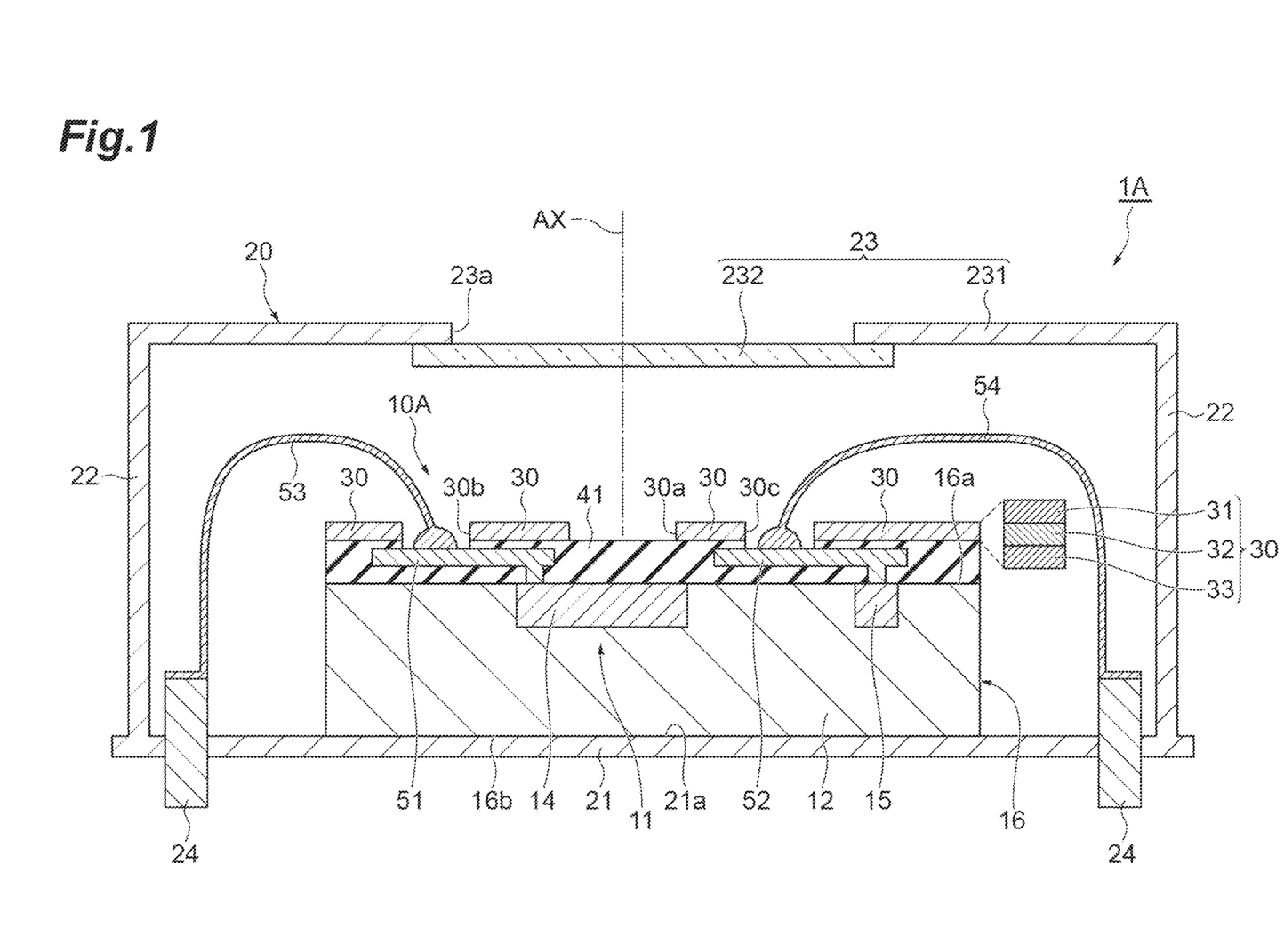
FIG. 1 is a cross-sectional view of a photodetection device according to a first embodiment.

FIG. 1 is a cross-sectional view of a photodetection device 1A according to a first embodiment, and illustrates a cross-section including an optical axis AX of detection target light. The photodetection device 1A includes a semiconductor photodetection element (hereinafter, simply referred to as a photodetection element) 10A for detecting an intensity of the detection target light, and a package 20 for hermetically containing the photodetection element 10A. A wavelength of the detection target light is within a range from a visible region to a near-infrared region, and is set to, for example, 350 nm or more and 1200 nm or less.

The package 20 includes a bottom plate 21, a side wall 22, and a top plate 23. The bottom plate 21 is a plate-shaped member on which the photodetection element 10A is mounted. A planar shape of the bottom plate 21 is, for example, a circular shape. The bottom plate 21 has conductivity, and is mainly made of a material such as Fe (iron).

The bottom plate 21 is provided with a plurality of pins 24 being provided through the bottom plate 21. The pin 24 is made of a conductive material, and the pin 24 and the bottom plate 21 are insulated from each other. The plurality of pins 24 enable electrical connection between the inside and the outside of the package 20. The bottom plate 21 has a mounting surface 21a for mounting the photodetection element 10A. In one example, the mounting surface 21a is a flat surface. The photodetection element 10A and the mounting surface 21a are bonded to each other, for example, by an adhesive such as silver paste.

The side wall 22 is a cylindrical member erected on a peripheral edge portion of the bottom plate 21, and surrounds the photodetection element 10A. The side wall 22 has conductivity, and is made of, for example, the same material as the bottom plate 21.

The top plate 23 is fixed to an upper end of the side wall 22 (one end opposite to the bottom plate 21), and covers the photodetection element 10A. An internal space of the package 20 is hermetically sealed by the bottom plate 21, the side wall 22, and the top plate 23. The top plate 23 includes a top plate portion 231 having conductivity, and an optical window 232 through which the detection target light passes.

The portion 231 has an annular shape centered on the optical axis AX of the detection target light. The portion 231 has conductivity, and is made of, for example, the same material as the bottom plate 21. The optical window 232 is a plate-shaped member that closes an opening portion 23a at the center of the circular ring of the portion 231. The optical window 232 has a light transmitting property for at least the wavelength of the detection target light.

In addition, in the present embodiment, the feature "having a light transmitting property" refers to being transparent for the target wavelength, that is, having a light transmittance of 70% or more. The optical window 232 is, for example, a glass plate. A peripheral edge portion of the optical window 232 and the portion 231 are hermetically connected by an adhesive.

The photodetection element 10A is disposed at a position facing the optical window 232 on the mounting surface 21a of the bottom plate 21. The photodetection element 10A includes a semiconductor substrate 16, electrode pads 51 and 52, and a light absorption film 30.

The semiconductor substrate 16 has a rectangular shape in a planar view. The semiconductor substrate 16 includes a principal surface 16a and a rear surface 16b being opposite to each other. The principal surface 16a is an example of a first surface in the present configuration, and the rear surface 16b is an example of a second surface in the present configuration. The detection target light is incident on the principal surface 16a. In one example, the semiconductor substrate 16 is a Si substrate or an InP substrate. A thickness (distance between the principal surface 16a and the rear surface 16b) of the semiconductor substrate 16 is, for example, 1 μm or more and 1000 μm or less.

The photodetection element 10A includes a photodetection region 11 formed on the principal surface 16a side of the semiconductor substrate 16. The photodetection region 11 generates a charge in an amount according to a light intensity of the detection target light. A reverse bias voltage is applied to the photodetection region 11 from a power source provided outside the photodetection device 1A. An output current from the photodetection region 11 is detected by a signal processing circuit provided outside the photodetection device 1A.

The photodetection region 11 includes a p-n junction photodiode or an avalanche photodiode. Specifically, the photodetection region 11 includes a semiconductor region 14 of a first conductivity type (for example, p-type). In addition, the photodetection region 11 includes the single semiconductor region 14 in the example illustrated in the diagram, and further, the photodetection region 11 may include a plurality of semiconductor regions 14 arranged one-dimensionally or two-dimensionally. The semiconductor region 14 is formed on the principal surface 16a side of the semiconductor substrate 16 (specifically, inside the semiconductor substrate 16 including the principal surface 16a). A planar shape of the semiconductor region 14 is, for example, a polygonal shape such as a quadrangular shape.

Further, the semiconductor substrate 16 further includes a semiconductor region 12 of a second conductivity type (for example, n-type), and a high concentration semiconductor region 15 of the second conductivity type (for example, n-type). The semiconductor region 15 is formed on the principal surface 16a side of the semiconductor substrate 16 (specifically, inside the semiconductor substrate 16 including the principal surface 16a) so as to be aligned with the semiconductor region 14 with an interval therebetween. The semiconductor region 12 occupies a region excluding the semiconductor regions 14 and 15 in the semiconductor substrate 16.

The electrode pads 51 and 52 are electrode pads for wire bonding. The electrode pads 51 and 52 are embedded in an insulating film 41 provided on the principal surface 16a of the semiconductor substrate 16, and are spaced apart from each other in a direction along the principal surface 16a. When the photodetection region 11 includes the plurality of semiconductor regions 14, the electrode pad 51 is provided for each semiconductor region 14.

The electrode pad 51 is exposed from the insulating film 41 through an opening formed in a portion of the insulating film 41 located on the side opposite to the principal surface 16a with respect to the electrode pad 51. One end of a bonding wire 53 is connected to the exposed portion of the electrode pad 51. The other end of the bonding wire 53 is connected to one of the plurality of pins 24.

That is, the electrode pad 51 can be electrically connected to an external circuit of the photodetection device 1A via the bonding wire 53 and the pin 24. The electrode pad 51 is electrically connected to the semiconductor region 14 via a conductive wiring line embedded in the insulating film 41 and an ohmic electrode of the first conductivity type.

The electrode pad 52 is exposed from the insulating film 41 through another opening formed in a portion of the insulating film 41 located on the side opposite to the principal surface 16a with respect to the electrode pad 52. One end of a bonding wire 54 is connected to the exposed portion of the electrode pad 52. The other end of the bonding wire 54 is connected to another one of the plurality of pins 24.

That is, the electrode pad 52 can be electrically connected to an external circuit of the photodetection device 1A via the bonding wire 54 and the pin 24. The electrode pad 52 is electrically connected to the semiconductor region 15 via a conductive wiring line embedded in the insulating film 41 and an ohmic electrode of the second conductivity type.

The electrode pads 51 and 52 and the wiring lines are made of metal. Examples of the metal used for the electrode pads 51 and 52 and the wiring lines include a single-layer film such as Al, Ti, Cu, Ni, or AlCu, and a multi-layer film such as Al/Ni, Al/Ti/Cu, Ti/Cu, Ti/Cu/Ni, or Ti/Cu/Ti. In addition, a notation A/B/C represents that an A layer, a B layer, and a C layer are stacked in this order from the semiconductor substrate 16 side. As a method of forming the electrode pads 51 and 52 and the wiring lines, a sputtering method or a plating method can be used.

As a material of the ohmic electrode of the first conductivity type (for example, p-type), for example, Al is used when the semiconductor substrate 16 is an Si substrate, and for example, AuZn is used when the semiconductor substrate 16 is an InP substrate. As a material of the ohmic electrode of the second conductivity type (for example, n-type), for example, Al is used when the semiconductor substrate 16 is a Si substrate, and for example, AuGe/Ni is used when the semiconductor substrate 16 is an InP substrate. As a method of forming the ohmic electrode, a sputtering method can be used.

When the semiconductor substrate 16 is a Si substrate, a group III element such as B is used as a p-type impurity, and a group V element such as P or As is used as an n-type impurity. When the semiconductor substrate 16 is an InP substrate, Zn or the like is used as the p-type impurity, and S, Sn or the like is used as the n-type impurity. The n-type and the p-type, which are conductivity types of the semiconductor, may be replaced with each other to form the device, and the device may function. As a method of adding these impurities, a diffusion method or an ion implantation method can be used.

As a material of the insulating film 41, an insulating silicon compound such as $SiO_2$, SiN, or SiON, an insulating metal oxide such as $Al_2O_3$ or $TiO_2$, or an insulating resin can be used. As a method of forming the insulating film 41, a chemical vapor deposition (CVD) method can be used. When the insulating film 41 is made of $SiO_2$, a thermal oxidation method may be used.

In the case of the configuration described above, a p-n junction is formed between the semiconductor region 14 of the first conductivity type and the semiconductor region 12 of the second conductivity type, thereby forming a photodiode as the photodetection region 11. When the photodetection region 11 is an avalanche photodiode, the photodetection region 11 is operated in Geiger mode.

In the Geiger mode, a reverse voltage (reverse bias voltage) larger than a breakdown voltage of the photodetection region 11 is applied between an anode and a cathode of the photodetection region 11. That is, a negative potential is applied to the anode, and a positive potential is applied to the cathode. The polarities of these potentials are relative, and one of the potentials may be set to a ground potential. The anode is the p-type region out of the semiconductor regions 14 and 15, and the cathode is the n-type region out of the semiconductor regions 14 and 15.

When photons of the detection target light are incident on the photodetection region 11, photoelectric conversion is performed inside the semiconductor substrate 16, and photoelectrons are generated. Avalanche multiplication is performed in a region near the p-n junction interface of the semiconductor region 14, and amplified carriers flow toward the electrode pad 51 or 52. That is, when a photon is incident on the photodetection region 11, electron multiplication is performed after photoelectric conversion, and a current signal is extracted from any one of the pins 24.

The light absorption film 30 is provided on the principal surface 16a of the semiconductor substrate 16 (on the insulating film 41 in the present embodiment). The light absorption film 30 is provided on a region of at least a part of a region around the photodetection region 11 on the principal surface 16a. The region around the photodetection region 11 refers to a region around the semiconductor region 14.

Further, the light absorption film 30 exposes at least a part of each of the electrode pads 51 and 52 for wire bonding. The light absorption film 30 of the example illustrated in the diagram is provided on the entire principal surface 16a excluding the region including a central portion of the semiconductor region 14 and the exposed regions from the insulating film 41 of the electrode pads 51 and 52. That is, the light absorption film 30 has an opening 30a on the semiconductor region 14, has an opening 30b on the electrode pad 51, and has an opening 30c on the electrode pad 52.

The light absorption film 30 is provided for absorbing the detection target light directed toward the region around the photodetection region 11. The light absorption film 30 has a multi-layer structure including a light absorption layer 31, a resonance layer 32, and a reflection layer 33.

The light absorption layer 31 constitutes a surface of the light absorption film 30. A thickness of the light absorption layer 31 is within a range of several nm to several µm. The resonance layer 32 is provided between the light absorption layer 31 and the semiconductor substrate 16, specifically, between the light absorption layer 31 and the reflection layer 33. A thickness of the resonance layer 32 is within a range of several nm to several hundred µm.

In one example, an optical thickness of the resonance layer 32 is an integer multiple of ¼ of the wavelength $\lambda$ of the detection target light. Further, the optical thickness of the resonance layer 32 may be within a range of ±20% centered on the integer multiple of $\lambda/4$. The reflection layer 33 is provided between the resonance layer 32 and the semiconductor substrate 16. A thickness of the reflection layer 33 is within a range of several tens of nm to several mm.

Further, at the wavelength $\lambda$ of the detection target light, a light transmittance inside the resonance layer 32 is larger than a light transmittance inside the light absorption layer 31. In other words, an extinction coefficient of the resonance layer 32 is smaller than an extinction coefficient of the light absorption layer 31.

The light absorption layer 31 is made of, for example, metal. The metal constituting the light absorption layer 31 may contain one or more materials selected from the group consisting of tungsten silicide ($WSi_x$), Ti, TiN, and Cr. In one example, the light absorption layer 31 mainly contains tungsten silicide, and in one example, is made of tungsten silicide.

The resonance layer 32 mainly contains, for example, a silicon compound such as $SiO_2$, SiN, or SiON, and in one example, is made of $SiO_2$, SiN, or SiON. At the wavelength $\lambda$ of the detection target light, the resonance layer 32 may have the light transmitting property. Further, at the wavelength $\lambda$, a light reflectance on the surface of the reflection layer 33 is larger than a light reflectance on the surface of the resonance layer 32. In addition, in the present embodiment, the "light reflectance on the surface of the reflection layer" refers to the light reflectance on the surface on the resonance layer side of the reflection layer, and the "light reflectance on the surface of the resonance layer" refers to the light reflectance on the surface on the light absorption layer side of the resonance layer.

The reflection layer 33 is a metal layer. The metal constituting the reflection layer 33 may contain one or more materials selected from the group consisting of Al, an Al-based alloy (AlCu, AlSi, or the like), Cu, Ag, and Au. In one example, the reflection layer 33 mainly contains Al, and in one example, is made of Al.

When forming the light absorption film 30, for example, the reflection layer 33 (for example, AlCu) may be formed on the insulating film 41 by sputtering, the resonance layer 32 (for example, $SiO_2$) may be formed thereon by CVD, and the light absorption layer 31 (for example, $WSi_x$) may be formed thereon by sputtering.

The function and effect obtained by the photodetection device 1A according to the present embodiment described above will be described. In the photodetection device 1A, the detection target light passing through the optical window 232 is incident on the photodetection region 11 of the photodetection element 10A. Further, a charge of an amount according to the light intensity of the detection target light being incident on the photodetection region 11 is generated in the photodetection region 11.

Thus, the incident light amount of the detection target light can be electrically detected. However, a part of the detection target light passing through the optical window 232 is directed toward the region around the photodetection region 11, not toward the photodetection region 11. The above part of the detection target light reaches the light absorption film 30 provided on the region of at least a part of the region around the photodetection region 11 on the principal surface 16a.

The light absorption film 30 has the multi-layer structure including the light absorption layer 31, the resonance layer 32, and the reflection layer 33. A part of the light incident on the light absorption film 30 is immediately absorbed in the light absorption layer 31. Light which is not absorbed by the light absorption layer 31 is transmitted through the light absorption layer 31 and enters the resonance layer 32. Further, the light entering the resonance layer 32 is gradually absorbed by the light absorption layer 31 while being multiply reflected between the interface between the light absorption layer 31 and the resonance layer 32 and the interface between the resonance layer 32 and the reflection layer 33.

Thus, according to the above light absorption film 30, extremely high absorption efficiency can be realized as compared with a light absorption film (black resin film or the like) of a single layer. Therefore, according to the photodetection device 1A of the present embodiment, it is possible to effectively reduce the reflection of the detection target light in the region around the photodetection region 11 on the principal surface 16a, and thus, it is possible to reduce light scattered in the internal space of the package 20 and suppress a decrease in temporal resolution of the photodetection element 10A.

As in the present embodiment, the photodetection element 10A may include the electrode pads 51 and 52 for wire bonding being electrically connected to the photodetection region 11 on the principal surface 16a. Further, the light absorption film 30 may expose at least a part of each of the electrode pads 51 and 52. In this case, it is possible to prevent the light absorption film 30 from interfering with the wire bonding to the electrode pads 51 and 52.

As described above, the optical thickness of the resonance layer 32 may be within a range of ±20% centered on the integer multiple of ¼ of the wavelength $\lambda$ (that is, $\lambda/4$) of the detection target light. In this case, a phase of the light reflected on the interface between the light absorption layer 31 and the resonance layer 32 and a phase of the light reflected on the interface between the resonance layer 32 and the reflection layer 33 are shifted from each other by nearly $\pi$ (rad), and thus, they cancel out each other. Therefore, the absorption efficiency (extinction efficiency) of the light absorption film 30 can be further increased.

As described above, the photodetection region 11 may include the avalanche photodiode or the p-n junction type photodiode. For example in the above case, a charge in an amount according to the light intensity of the detection target light can be generated in the photodetection region 11.

As described above, the light absorption layer 31 may mainly contain tungsten silicide, and the resonance layer 32 may mainly contain $SiO_2$. In this case, it is possible to realize the light absorption film 30 having high absorption efficiency.

Figure 2:
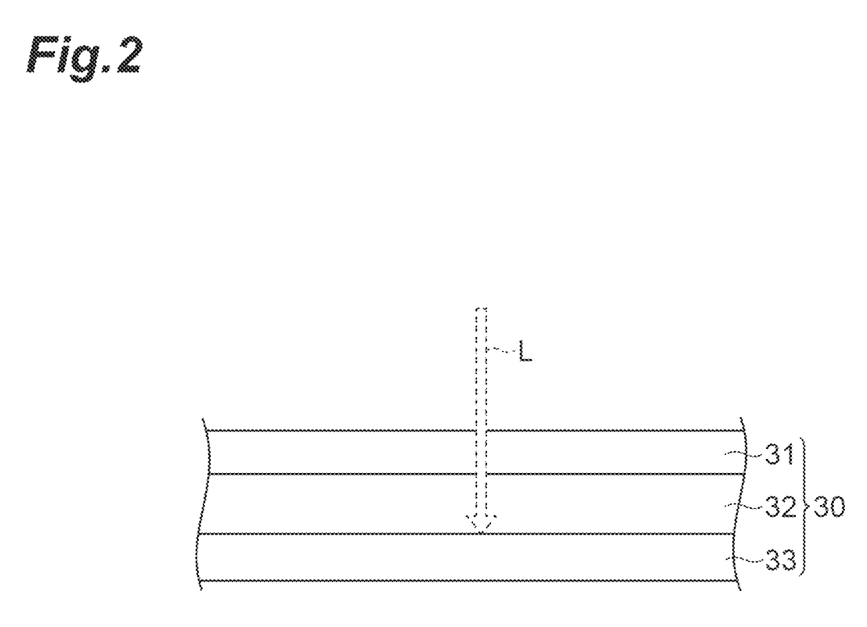
FIG. 2 is a diagram schematically illustrating a cross-sectional configuration of a light absorption film.

In addition, the function of the light absorption film 30 of the present embodiment will be described in detail. FIG. 2 is a diagram schematically illustrating a cross-sectional configuration of the light absorption film 30.

As described above, the light absorption film 30 has the multi-layer structure including the light absorption layer 31, the resonance layer 32, and the reflection layer 33. A part of the light L reaching the light absorption film 30 is reflected on the surface of the light absorption layer 31, and the remaining part enters the inside of the light absorption layer 31. In this case, when a sheet resistance of the light absorption layer 31 is matched with a spatial impedance of a medium (for example, air) in contact with the surface of the light absorption layer 31, the surface reflectance becomes zero, and all the light L enters the inside of the light absorption layer 31.

The light L entering the inside of the light absorption layer 31 is gradually absorbed at a ratio calculated based on the extinction coefficient of the light absorption layer 31, and thus, when the light absorption layer 31 is sufficiently thick, most of the light L is absorbed by the light absorption layer 31. However, an increase in thickness of the light absorption layer 31 leads to a decrease in sheet resistance, resulting in an increase in surface reflectance of the light absorption layer 31. Therefore, in the present embodiment, the thickness of the light absorption layer 31 is limited to allow a part of the light L to pass through the light absorption layer 31.

A part of the transmitted light L is reflected on the interface between the light absorption layer 31 and the resonance layer 32, and returns to the light absorption layer 31. Hereinafter, the above reflected light is referred to as first reflected light. When the light absorption layer 31 is made of metal and the resonance layer 32 is made of dielectric, the first reflected light does not include a phase shift of 7 (rad) because the impedance of the resonance layer 32 is larger than the impedance of the light absorption layer 31 (in other words, the refractive index of the resonance layer 32 is smaller than the refractive index of the light absorption layer 31).

Further, the remaining part of the light L passes through the interface and enters the inside of the resonance layer 32. The light L that has entered the inside of the resonance layer 32 reaches the interface between the resonance layer 32 and the reflection layer 33 almost without being attenuated, and is totally reflected on the interface. Hereinafter, the above reflected light is referred to as second reflected light. The second reflected light travels inside the resonance layer 32 again toward the light absorption layer 31. The impedance of the reflection layer 33 is close to 0Ω (in other words, the refractive index is close to infinity), and therefore, the second reflected light includes a phase shift of 7 (rad).

When the phase difference between the second reflected light and the first reflected light is π (rad) when the second reflected light reaches the light absorption layer 31, they cancel each other out. For this purpose, it is preferable that the optical thickness of the resonance layer 32 (in other words, the optical distance between the light absorption layer 31 and the reflection layer 33) is close to ¼ of the wavelength of the light L. In this regard, in the above description, the optical thickness of the resonance layer 32 is set within a range of ±20% centered on ¼ of the wavelength of the light L.

In addition, the electric field amplitude of the first reflected light and the electric field amplitude of the second reflected light are not exactly the same, and therefore, they do not completely cancel each other out, and a part of the reflected light is incident on the light absorption layer 31. The reflected light incident on the light absorption layer 31 is absorbed in the light absorption layer 31. Further, a part of the second reflected light remains inside the resonance layer 32 and repeats multiple reflection, but is gradually absorbed by the light absorption layer 31. Thus, most of the light L is absorbed by the light absorption layer 31.

A design example of the light absorption film 30 will be described. In the present embodiment, the light absorption layer 31 of the light absorption film 30 is in contact with air. The wavelength of the light L is assumed to be 1.55 μm. It is assumed that the light absorption layer 31 is made of WSi, the resonance layer 32 is made of $SiO_2$, and the reflection layer 33 is made of Al.

The characteristic impedance of air is 377Ω. The specific resistance of tungsten silicide ($WSi_2$) is $2.48 \times 10^{-4}$ Ω·cm. Therefore, a preferred thickness t of the light absorption layer 31 is calculated as follows.

$$t = \frac{2.48 \times 10^{-4} \Omega \cdot cm}{377 \Omega} = 6.6 \times 10^{-7} \text{ cm} = 6.6 \text{ nm} \quad \text{[Formula 1]}$$

Further, the specific refractive index of $SiO_2$ is 1.48, and thus, a preferred thickness of the resonance layer 32 is calculated as 1.55 μm/1.48/4=262 nm. Further, the specific resistance of Al is $2.65 \times 10^{-6}$ Ω·cm, and thus, the sheet resistance is 0.0265Ω by setting the reflection layer 33 to have a sufficient thickness of, for example, 1 μm. The impedance of $SiO_2$ is as follows.

$$\frac{377 \Omega}{1.48} = 255 \Omega \quad \text{[Formula 2]}$$

Therefore, the reflection coefficient at the interface between the resonance layer 32 and the reflection layer 33 is 0.998.

According to the procedure described above, it is also easy to design the light absorption film 30 according to the wavelength λ of the detection target light. The following Table 1 is a table showing a design example of the light absorption film 30 in the case where the wavelength λ of the detection target light is set to 400 nm, 800 nm, and 1000 nm.

TABLE 1

| detection target light | light absorption layer | | resonance layer | | reflection layer | |
|---|---|---|---|---|---|---|
| wavelength (nm) | material | thickness (nm) | material | thickness (nm) | material | thickness (nm) |
| 400 | $WSi_2$ | 6.6 | $SiO_2$ | 160 | Al | 1000 |
| 800 | $WSi_2$ | 6.6 | $SiO_2$ | 340 | Al | 1000 |
| 1000 | $WSi_2$ | 6.6 | $SiO_2$ | 440 | Al | 1000 |

In addition, in the design example described above, it is assumed that the light L is incident from a direction perpendicular to the surface of the light absorption film 30 (in other words, the thickness direction of the light absorption film 30), however, when the light L is incident from a direction inclined with respect to the surface of the light absorption film 30, the incident angle of the light L may be added to the above design. That is, a propagation angle of the light in each of the layers 31 to 33 may be calculated from the refractive index of each of the layers 31 to 33, and the thickness of each of the layers 31 to 33 may be set in consideration of the propagation angle.

First Modification

Figure 3:
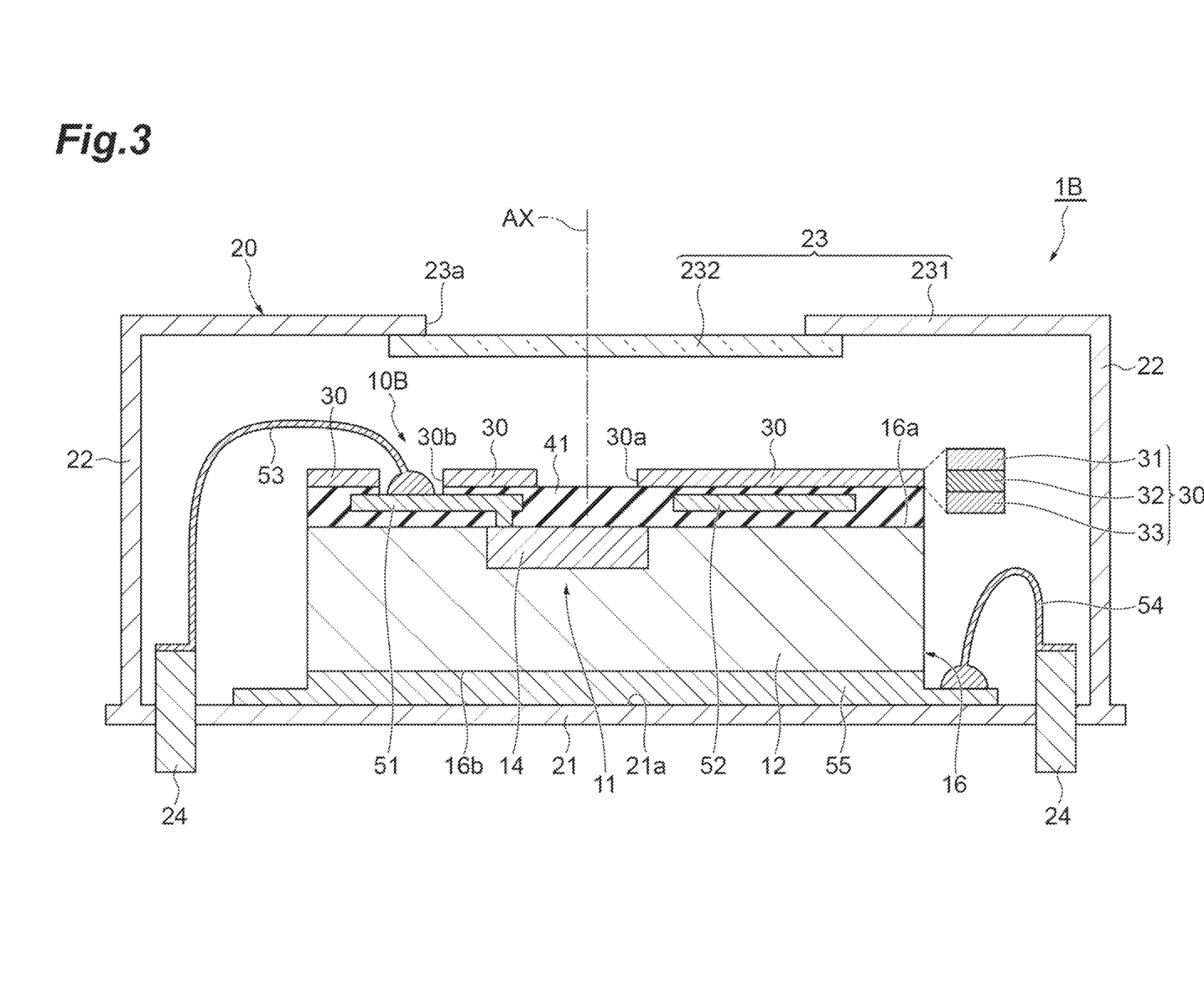
FIG. 3 is a cross-sectional view of a photodetection device according to a first modification.

FIG. 3 is a cross-sectional view of a photodetection device 1B according to a first modification of the above embodiment, and illustrates a cross-section including the optical axis AX of the detection target light. The photodetection device 1B includes a photodetection element 10B for detecting the intensity of the detection target light, and the package 20 for hermetically containing the photodetection element 10B. The wavelength of the detection target light and the configuration of the package 20 are the same as those in the first embodiment.

The photodetection element 10B of the present modification is different from the photodetection element 10A of the first embodiment in that the semiconductor substrate 16 does not include the semiconductor region 15 (see FIG. 1), and includes a rear surface electrode 55.

The rear surface electrode 55 forms ohmic contact with the rear surface 16b of the semiconductor substrate 16, and is thereby electrically connected to the semiconductor region 12. In the illustrated example, the rear surface electrode 55 is provided on the entire rear surface 16b. The photodetection element 10B is connected to the mounting surface 21a of the bottom plate 21 via the rear surface electrode 55. The rear surface electrode 55 is a metal film, and its constituent material is, for example, Au.

A peripheral portion of the rear surface electrode 55 protrudes to the outside of the rear surface 16b, and the one end of the bonding wire 54 is connected to the peripheral portion. Therefore, the bonding wire 54 is not connected to the electrode pad 52. Further, the light absorption film 30 of the present modification does not have the opening 30c for wire bonding of the electrode pad 52.

The photodetection device 1B of the present modification having the above configuration can also achieve the same function and effect as those of the first embodiment.

Second Modification

Figure 4:
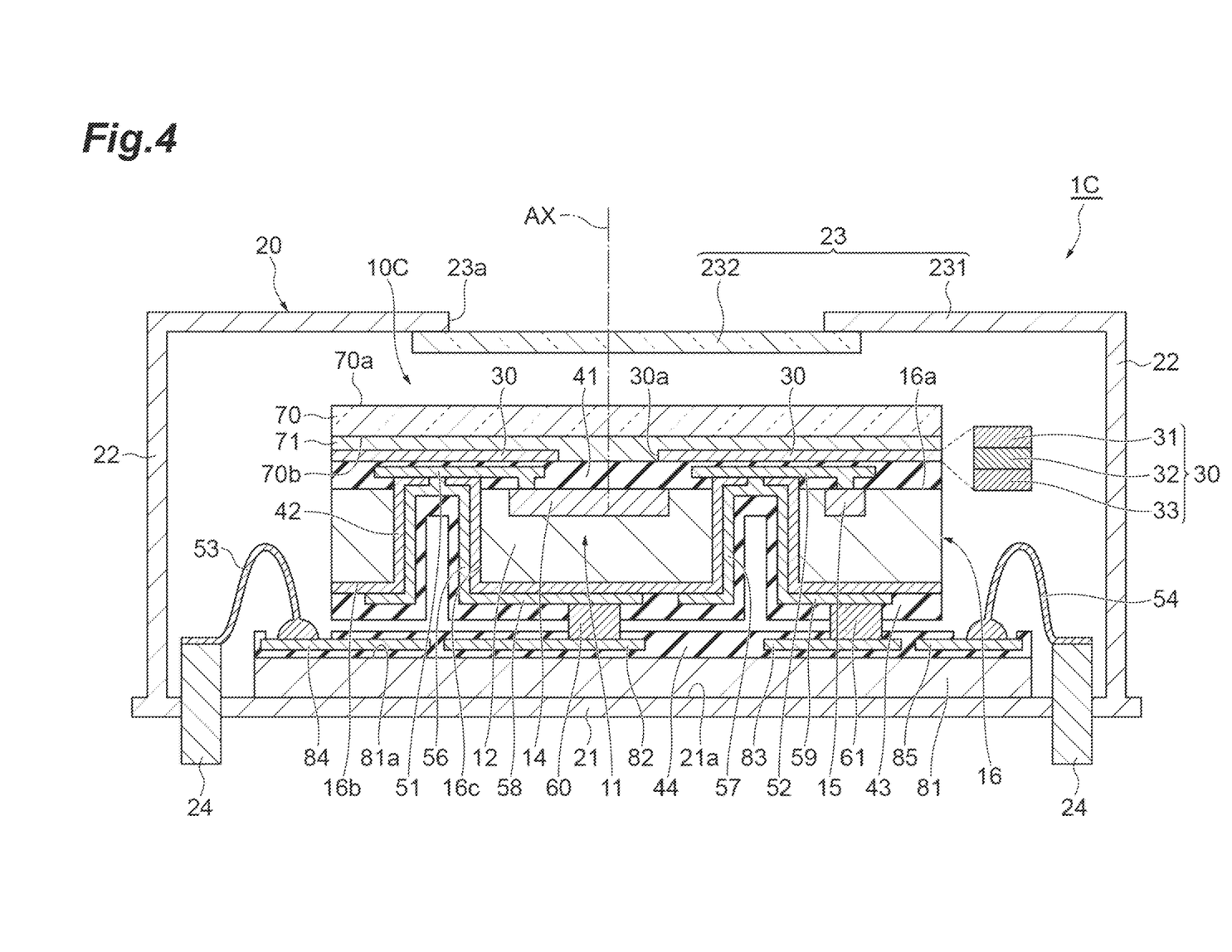
FIG. 4 is a cross-sectional view of a photodetection device according to a second modification.

FIG. 4 is a cross-sectional view of a photodetection device 1C according to a second modification of the above embodiment, and illustrates a cross-section including the optical axis AX of the detection target light. The photodetection device 1C includes a photodetection element 10C for detecting the intensity of the detection target light, the package 20 for hermetically containing the photodetection element 10C, and a mounting substrate 81. The wavelength of the detection target light and the configuration of the package 20 are the same as those in the first embodiment.

The photodetection element 10C of the present modification is different from the photodetection element 10A of the first embodiment in that the semiconductor substrate 16 includes a through wiring line 56, a through wiring line 57, a rear surface electrode 58, a rear surface electrode 59, a bump electrode 60, a bump electrode 61, and a glass substrate 70. When the photodetection region 11 includes the plurality of semiconductor regions 14, the through wiring line 56, the rear surface electrode 58, and the bump electrode 60 are provided for each semiconductor region 14.

The rear surface electrodes 58 and 59 are provided on the rear surface 16b with an insulating film 42 interposed therebetween. The through wiring lines 56 and 57 are formed to penetrate between the principal surface 16a and the rear surface 16b of the semiconductor substrate 16. That is, the through wiring lines 56 and 57 are disposed in through holes 16c provided through the semiconductor substrate 16. An inner side surface of the through hole 16c extends in a thickness direction of the semiconductor substrate 16 (that is, a direction perpendicular to the principal surface 16a and the rear surface 16b). The insulating film 42 is formed also in the through hole 16c. The through wiring lines 56 and 57 are disposed on the inner side surfaces and bottom surfaces of the through holes 16c with the insulating film 42 interposed therebetween.

One end of the through wiring line 56 is connected to the electrode pad 51, and is electrically connected to the semiconductor region 14 of the photodetection region 11 via the electrode pad 51 and the ohmic electrode. The other end of the through wiring line 56 is connected to the rear surface electrode 58. One end of the through wiring line 57 is connected to the electrode pad 52, and is electrically connected to the semiconductor region 15 via the electrode pad 52 and the ohmic electrode. The other end of the through wiring line 57 is connected to the rear surface electrode 59.

The through wiring lines 56 and 57 and the rear surface electrodes 58 and 59 are made of metal. Examples of the metal used for the through wiring lines 56 and 57 and the rear surface electrodes 58 and 59 include a single-layer film such as Al, Ti, Cu, Ni, or AlCu, and a multi-layer film such as Al/Ni, Al/Ti/Cu, Ti/Cu, Ti/Cu/Ni, or Ti/Cu/Ti.

The mounting substrate 81 is placed on the mounting surface 21a of the bottom plate 21. The mounting substrate 81 has a flat principal surface 81a. The principal surface 81a faces the rear surface 16b of the semiconductor substrate 16. The mounting substrate 81 includes electrodes 82, 83, 84, and 85 disposed on the principal surface 81a. The electrodes 82 and 83 are disposed respectively corresponding to the through wiring lines 56 and 57. Specifically, the electrodes 82 and 83 are formed on regions of the principal surface 81a respectively facing the rear surface electrodes 58 and 59.

The rear surface electrode 58 and the electrode 82 are connected by the bump electrode 60. Thus, the through wiring line 56 is electrically connected to the electrode 82 via the rear surface electrode 58 and the bump electrode 60. Similarly, the rear surface electrode 59 and the electrode 83 are connected by the bump electrode 61. Thus, the through wiring line 57 is electrically connected to the electrode 83 via the rear surface electrode 59 and the bump electrode 61. The electrodes 82 and 83 are made of the same metal as the through wiring lines 56 and 57 and the rear surface electrodes 58 and 59. The bump electrodes 60 and 61 mainly contain, for example, solder.

The mounting substrate 81 includes a signal processing circuit. That is, the mounting substrate 81 constitutes an application specific integrated circuit (ASIC). Each of the electrodes 82 and 83 is electrically connected to the signal processing circuit via a wiring line (not shown) formed in the mounting substrate 81. The output signal from the photodetection region 11 is input to the signal processing circuit, and the signal processing circuit processes the output signal from the photodetection region 11.

The signal processing circuit includes a CMOS circuit which converts the output signal from the photodetection region 11 into a digital pulse. Further, when the photodetection region 11 includes the plurality of semiconductor regions 14, the mounting substrate 81 is configured to include a circuit for recording time information corresponding to each semiconductor region 14. As the circuit for recording the time information, a time-to-digital converter (TDC), a time-to-amplitude converter (TAC), or the like may be used. Accordingly, a difference in wiring distance in the mounting substrate 81 does not affect temporal resolution.

The output signal from the signal processing circuit is output from the electrodes 84 and 85. The one end of the bonding wire 53 is connected to the electrode 84, and the one end of the bonding wire 54 is connected to the electrode 85. Thus, the output signal from the signal processing circuit is output to the outside of the photodetection device 1C through the bonding wires 53 and 54 and the pins 24.

An insulating protective film 43 which covers the through wiring lines 56 and 57 and the rear surface electrodes 58 and 59 is provided on the rear surface 16b of the semiconductor substrate 16. The insulating protective film 43 has an opening formed at a position corresponding to the bump electrode 60 and an opening formed at a position corresponding to the bump electrode 61.

An insulating film 44 in which the electrodes 82 to 85 are embedded is provided on the principal surface 81a of the mounting substrate 81. The insulating film 44 has an opening formed at a position on the electrode 82 corresponding to the bump electrode 60, an opening formed at a position on the electrode 83 corresponding to the bump electrode 61, an opening for the bonding wire 53 formed on the electrode 84, and an opening for the bonding wire 54 formed on the electrode 85.

The insulating protective film 43 and the insulating film 44 are formed of, for example, a resin insulating film such as a polyimide-based film, a phenol-based film, or an epoxy-based film, a SiO$_2$/resin insulating film, a SiN/resin insulating film, a SiON/resin insulating film, a SiO$_2$ film, a SiN film, or a SiON film. As a method of forming the insulating protective film 43 and the insulating film 44, a spin coating method can be used in the case of the resin insulating film, and a CVD method can be used in the case of the SiO$_2$ film.

The glass substrate 70 has the light transmitting property for the wavelength of the detection target light. The glass substrate 70 is disposed on the light absorption film 30. The glass substrate 70 includes a principal surface 70a and a rear surface 70b being opposite to each other. The rear surface 70b faces the principal surface 16a of the semiconductor substrate 16. The principal surface 70a and the rear surface 70b are flat surfaces. The glass substrate 70 is bonded and optically coupled to the light absorption film 30 and the insulating film 41 in the opening 30a by an optical adhesive 71. The optical adhesive 71 embeds the opening 30a of the light absorption film 30.

In the present modification, the photodetection element 10C is electrically connected to the mounting substrate 81 via the bump electrodes 60 and 61 on the rear surface 16b. Therefore, the openings 30b and 30c (see FIG. 1) of the light absorption film 30 are not required in the present modification.

The photodetection device 1C of the present modification having the above configuration can also achieve the same function and effect as those of the first embodiment. In addition, in the present modification, the medium in contact with the light absorption layer 31 is not air but the optical adhesive 71. The following Table 2 is a table showing a design example of the refractive index of the optical adhesive 71 and the light absorption film 30 in the case where the wavelength λ of the detection target light is set to 400 nm, 800 nm, and 1000 nm.

TABLE 2

| detection target light | optical adhesive | light absorption layer | | resonance layer | | reflection layer | |
|---|---|---|---|---|---|---|---|
| wavelength (nm) | refractive index | material | thickness (nm) | material | thickness (nm) | material | thickness (nm) |
| 400 | 1.64 | WSi$_2$ | 10.6 | SiO$_2$ | 160 | Al | 1000 |
| 800 | 1.583 | WSi$_2$ | 10.4 | SiO$_2$ | 340 | Al | 1000 |
| 1000 | 1.579 | WSi$_2$ | 10.4 | SiO$_2$ | 440 | Al | 1000 |

Third Modification

Figure 5:
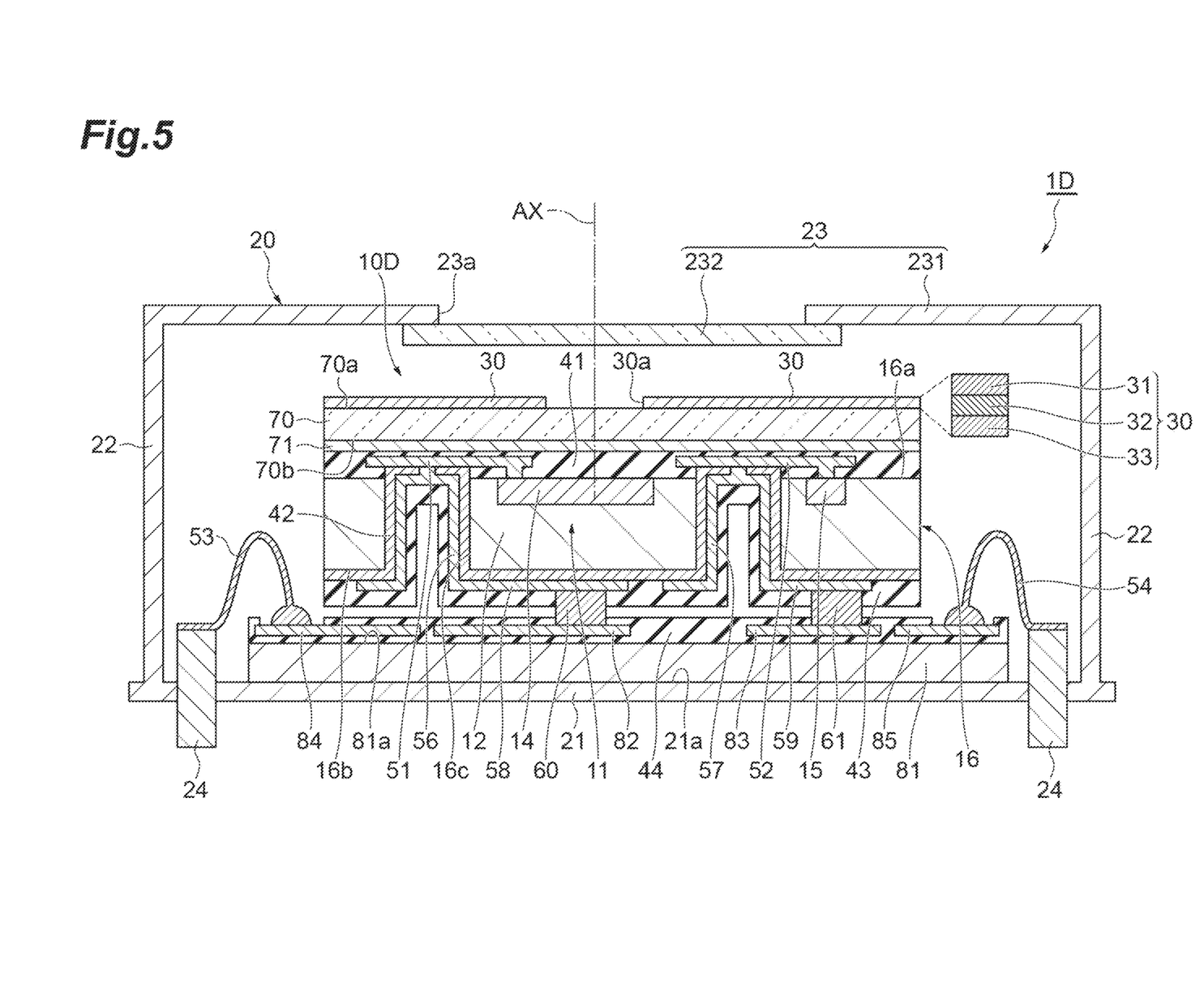
FIG. 5 is a cross-sectional view of a photodetection device according to a third modification.

FIG. 5 is a cross-sectional view of a photodetection device 1D according to a third modification of the above embodiment, and illustrates a cross-section including the optical axis AX of the detection target light. The photodetection device 1D includes a photodetection element 10D for detecting the intensity of the detection target light, the package 20 for hermetically containing the photodetection element 10D, and the mounting substrate 81.

The present modification is different from the second modification in that the light absorption film 30 is provided on the principal surface 70a of the glass substrate 70 in the photodetection device 1D. That is, the rear surface 70b of the glass substrate 70 is bonded to the insulating film 41 via the optical adhesive 71, and the reflection layer 33, the resonance layer 32, and the light absorption layer 31 of the light absorption film 30 are formed on the principal surface 70a in this order. The photodetection device 1D of the present modification having the above configuration can also achieve the same function and effect as those of the first embodiment.

Fourth Modification

Figure 6:
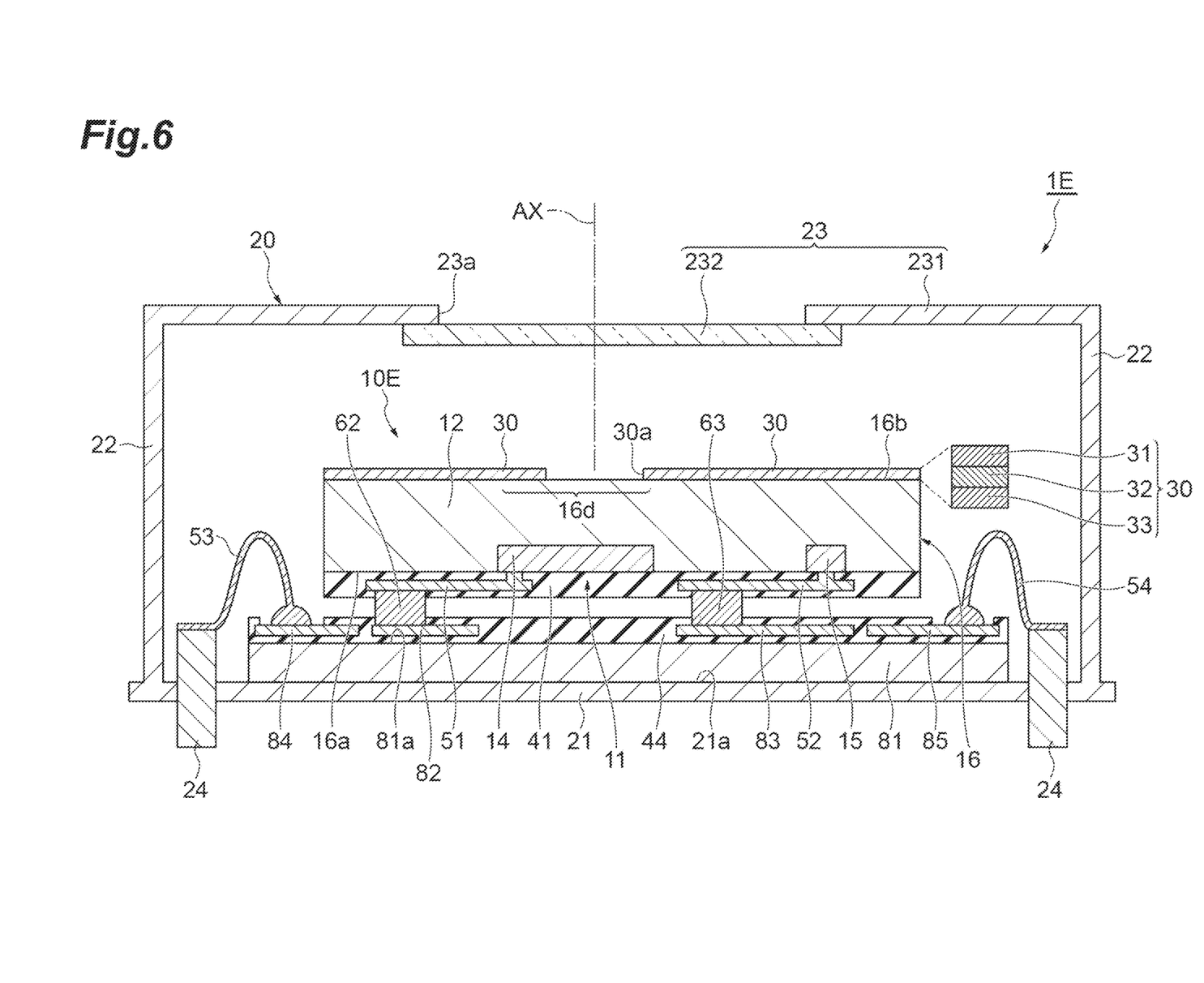
FIG. 6 is a cross-sectional view of a photodetection device according to a fourth modification.

FIG. 6 is a cross-sectional view of a photodetection device 1E according to a fourth modification of the above embodiment, and illustrates a cross-section including the optical axis AX of the detection target light. The photodetection device 1E includes a photodetection element 10E for detecting the intensity of the detection target light, the package 20 for hermetically containing the photodetection element 10E, and the mounting substrate 81. The present modification is different from the first embodiment in that the detection target light is incident on the photodetection element 10E from the rear surface 16b side of the semiconductor substrate 16, and further, in that the mounting substrate 81 is provided.

As in the photodetection element 10A of the first embodiment, the photodetection element 10E includes the semiconductor substrate 16, the insulating film 41, and the electrode pads 51 and 52. The electrode pads 51 and 52 are provided on the principal surface 16a of the semiconductor substrate 16. The semiconductor substrate 16 includes the semiconductor regions 12, 14, and 15. The configurations of the semiconductor substrate 16, the insulating film 41, and the electrode pads 51 and 52 are the same as those in the first embodiment.

The configuration of the mounting substrate 81 is the same as that in the second modification. In addition, the electrodes 82 and 83 of the mounting substrate 81 are disposed respectively corresponding to the electrode pads 51 and 52. Specifically, the electrodes 82 and 83 are formed on regions of the principal surface 81a respectively facing the electrode pads 51 and 52.

The electrode pad 51 and the electrode 82 are connected by a bump electrode 62. Thus, the semiconductor region 14 is electrically connected to the electrode 82 via the electrode pad 51 and the bump electrode 62. Similarly, the electrode pad 52 and the electrode 83 are connected by a bump electrode 63. Thus, the semiconductor region 15 is electrically connected to the electrode 83 via the electrode pad 52 and the bump electrode 63. The electrodes 82 and 83 are made of the same metal as the electrode pads 51 and 52. The bump electrodes 62 and 63 mainly contain, for example, solder.

The light absorption film 30 of present modification is provided on the rear surface 16b of the semiconductor substrate 16. The light absorption film 30 is provided for the rear surface 16b on a region of at least a part of a region around a region 16d obtained by projecting the photodetection region 11 in a direction opposite to the incident direction of the detection target light (that is, a direction toward the optical window 232). The light absorption film 30 in the illustrated example is provided on the entire rear surface 16b excluding the region including a central portion of the region 16d. That is, the light absorption film 30 has the opening 30a on the region 16d. The semiconductor substrate 16 is exposed from the light absorption film 30 through the opening 30a.

The light absorption film 30 is provided for absorbing the detection target light directed toward the region around the region 16d. As in the first embodiment, the light absorption film 30 has the multi-layer structure including the light absorption layer 31, the resonance layer 32, and the reflection layer 33. The detailed configuration of the light absorption layer 31, the resonance layer 32, and the reflection layer 33 is the same as that in the first embodiment.

The photodetection device 1E of the present modification having the above configuration can also achieve the same function and effect as those of the first embodiment. That is, according to the photodetection device 1E, it is possible to effectively reduce the reflection of the detection target light in the region around the region 16d obtained by projecting the photodetection region 11 on the principal surface 16a in the direction opposite to the incident direction of the detection target light, and thus, it is possible to reduce light scattered in the internal space of the package 20 and suppress a decrease in temporal resolution of the photodetection element 10E.

Fifth Modification

Figure 7:
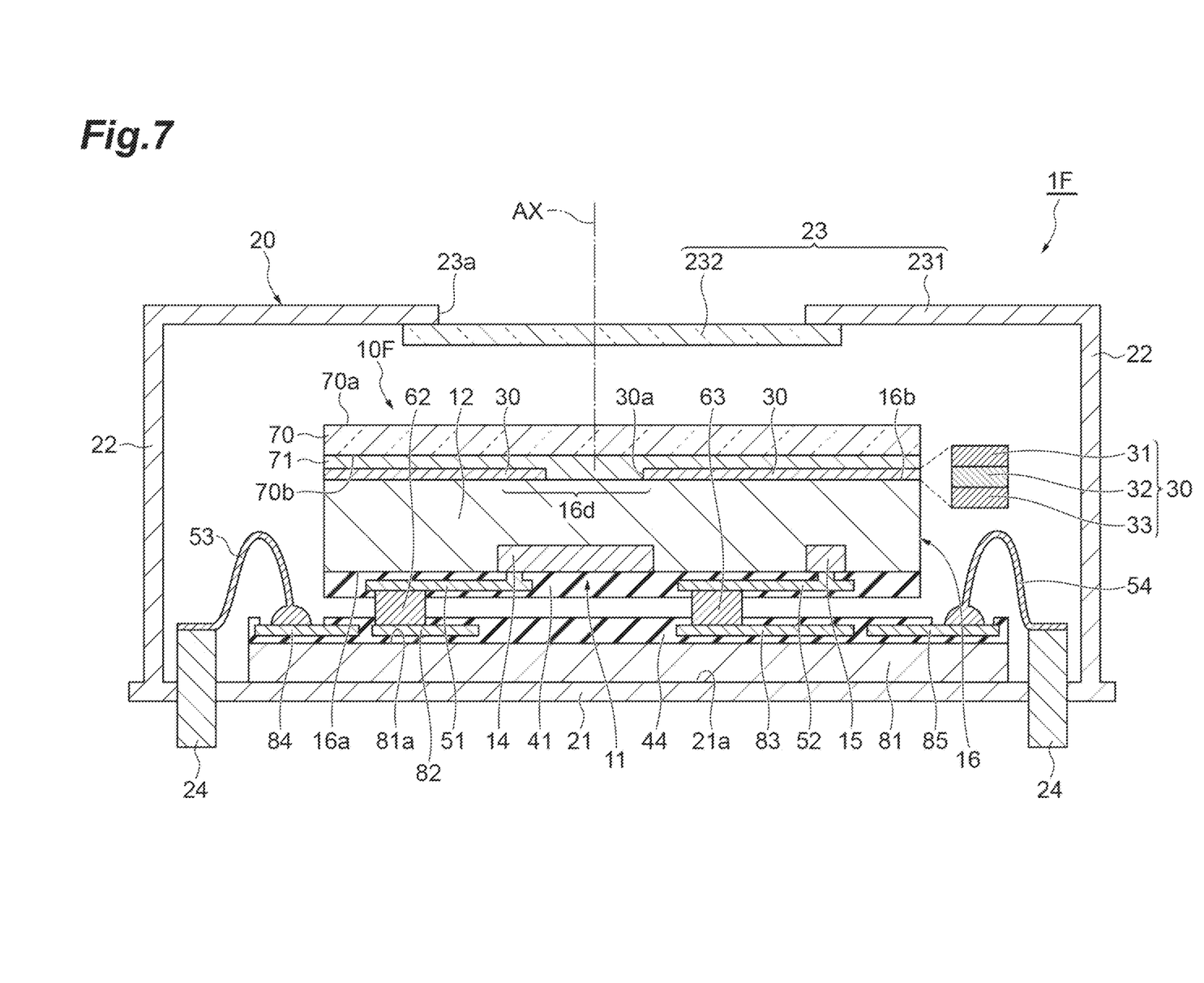
FIG. 7 is a cross-sectional view of a photodetection device according to a fifth modification.

FIG. 7 is a cross-sectional view of a photodetection device 1F according to a fifth modification of the above embodiment, and illustrates a cross-section including the optical axis AX of the detection target light. The photodetection device 1F includes a photodetection element 10F for detecting the intensity of the detection target light, the package 20 for hermetically containing the photodetection element 10F, and the mounting substrate 81. The present modification is different from the fourth modification in that the photodetection element 10F includes the glass substrate 70.

The configuration of the glass substrate 70 is the same as that in the second modification (see FIG. 4) described above. That is, the glass substrate 70 has the light transmitting property for the wavelength of the detection target light. The glass substrate 70 is disposed on the light absorption film 30. The glass substrate 70 includes the principal surface 70a and the rear surface 70b being opposite to each other. The rear surface 70b faces the rear surface 16b of the semiconductor substrate 16. The principal surface 70a and the rear surface 70b are flat surfaces. The glass substrate 70 is bonded and optically coupled to the light absorption film 30 and the semiconductor substrate 16 in the opening 30a by the optical adhesive 71. The optical adhesive 71 embeds the opening 30a of the light absorption film 30.

The photodetection device 1F of the present modification having the above configuration can also achieve the same function and effect as those of the first embodiment.

Sixth Modification

Figure 8:
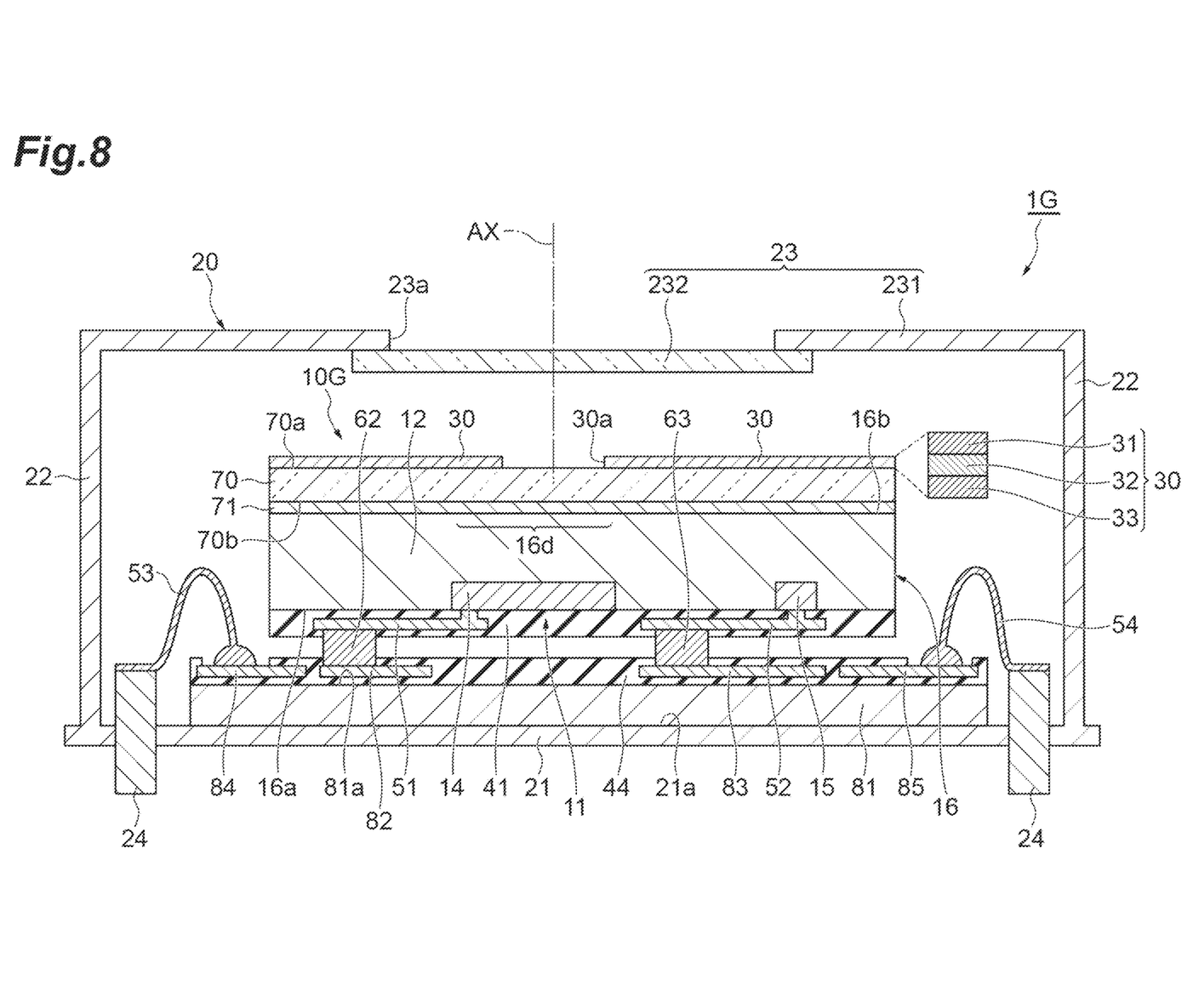
FIG. 8 is a cross-sectional view of a photodetection device according to a sixth modification.

FIG. 8 is a cross-sectional view of a photodetection device 1G according to a sixth modification of the above embodiment, and illustrates a cross-section including the optical axis AX of the detection target light. The photodetection device 1G includes a photodetection element 10G for detecting the intensity of the detection target light, the package 20 for hermetically containing the photodetection element 10G, and the mounting substrate 81.

The present modification is different from the fifth modification in that the light absorption film 30 is provided on the principal surface 70a of the glass substrate 70 in the photodetection device 1G That is, the rear surface 70b of the glass substrate 70 is bonded to the rear surface 16b of the semiconductor substrate 16 via the optical adhesive 71, and the reflection layer 33, the resonance layer 32, and the light absorption layer 31 of the light absorption film 30 are formed on the principal surface 70a in this order. The photodetection device 1G of the present modification having the above configuration can also achieve the same function and effect as those of the first embodiment.

The photodetection device is not limited to the embodiments and configuration examples described above, and various modifications are possible. For example, the photodetection region 11 is not limited to the photodiode, and may include, for example, a charge coupled device (CCD). Even in the above case, the effect of suppressing a decrease in temporal resolution can be achieved.

The first photodetection device of the above embodiment includes a semiconductor photodetection element, and a package. The package has an optical window through which detection target light passes, and places the semiconductor photodetection element in the package. The semiconductor photodetection element includes a semiconductor substrate and a light absorption film. The semiconductor substrate has a first surface on which the detection target light is incident, and a second surface opposite to the first surface, and includes a photodetection region on the first surface side for generating a charge in an amount according to a light intensity of the detection target light. The light absorption film is provided on a region of at least a part of a region around the photodetection region on the first surface. The light absorption film has a multi-layer structure including a light absorption layer, a resonance layer provided between the light absorption layer and the semiconductor substrate, and a reflection layer being a metal layer provided between the resonance layer and the semiconductor substrate. At a wavelength of the detection target light, a light transmittance inside the resonance layer is larger than a light transmittance inside the light absorption layer, and a light reflectance on a surface of the reflection layer is larger than a light reflectance on a surface of the resonance layer.

In the above photodetection device, the semiconductor photodetection element may further include an electrode pad for wire bonding electrically connected to the photodetection region on the first surface, and the light absorption film may expose at least a part of the electrode pad. In this case, it is possible to prevent the light absorption film from interfering with the wire bonding to the electrode pad.

The second photodetection device of the above embodiment includes a semiconductor photodetection element, and a package. The package has an optical window through which detection target light passes, and places the semiconductor photodetection element in the package. The semiconductor photodetection element includes a semiconductor substrate and a light absorption film. The semiconductor substrate has a first surface, and a second surface opposite to the first surface and on which the detection target light is incident, and includes a photodetection region on the first surface for generating a charge in an amount according to a light intensity of the detection target light. The light absorption film is provided on a region of at least a part of a region around a region obtained by projecting the photodetection region on the second surface in a direction opposite to an incident direction of the detection target light. The light absorption film has a multi-layer structure including a light absorption layer, a resonance layer provided between the light absorption layer and the semiconductor substrate, and a reflection layer being a metal layer provided between the resonance layer and the semiconductor substrate. At a wavelength of the detection target light, a light transmittance inside the resonance layer is larger than a light transmittance inside the light absorption layer, and a light reflectance on a surface of the reflection layer is larger than a light reflectance on a surface of the resonance layer.

In the above first or second photodetection device, an optical thickness of the resonance layer may be within a range of ±20% centered on an integer multiple of ¼ of the wavelength of the detection target light. In this case, a phase of the light reflected on the interface between the light absorption layer and the resonance layer and a phase of the light reflected on the interface between the resonance layer and the reflection layer are shifted from each other by nearly π (rad), and thus, these cancel each other out. Therefore, the absorption efficiency (extinction efficiency) of the light absorption film can be further increased.

In the above first or second photodetection device, the photodetection region may include an avalanche photodiode or a p-n junction type photodiode. For example in the above case, a charge in an amount according to the light intensity of the detection target light can be generated in the photodetection region.

In the above first or second photodetection device, the light absorption layer may mainly contain tungsten silicide, and the resonance layer may mainly contain $SiO_2$. In this case, the light absorption film having high absorption efficiency can be realized.

INDUSTRIAL APPLICABILITY

The present invention can be used as a photodetection device capable of reducing light scattered in a package.

REFERENCE SIGNS LIST 1A-1G—photodetection device, 10A-10G—photodetection element, 11—photodetection region, 12, 14, 15—semiconductor region, 16a—principal surface, 16b—rear surface, 16c—through hole, 16d—region, 20—package, 21—bottom plate, 21a—mounting surface, 22—side wall, 23—top plate, 23a—opening portion, 24—pin, 30—light absorption film, 30a, 30b, 30c—opening, 31—light absorption layer, 32—resonance layer, 33—reflection layer, 41, 42, 44—insulating film, 43—insulating protective film, 51, 52—electrode pad, 53, 54—bonding wire, 55—rear surface electrode, 56, 57—through wiring line, 58, 59—rear surface electrode, 60-63—bump electrode, 70—glass substrate, 70a—principal surface, 70b—rear surface, 71—optical adhesive, 81—mounting substrate, 81a—principal surface, 82-85—electrode, 231—portion, 232—optical window, 16—semiconductor substrate, AX—optical axis, L—light.

The invention claimed is:

1. A photodetection device comprising:
   a semiconductor photodetection element including a semiconductor substrate having a first surface on which detection target light is incident, and a second surface opposite to the first surface, and including a photodetection region on the first surface side configured to generate a charge in an amount according to a light intensity of the detection target light, and a light absorption film provided on a region of at least a part of a region around the photodetection region on the first surface; and
   a package having an optical window through which the detection target light passes, and configured to contain the semiconductor photodetection element, wherein
   the light absorption film has a multi-layer structure including a light absorption layer, a resonance layer provided between the light absorption layer and the semiconductor substrate, and a reflection layer being a metal layer provided between the resonance layer and the semiconductor substrate, and
   at a wavelength of the detection target light, a light transmittance inside the resonance layer is larger than a light transmittance inside the light absorption layer, and a light reflectance on a surface of the reflection layer is larger than a light reflectance on a surface of the resonance layer, and wherein
   the light absorption layer mainly contains tungsten silicide.

2. The photodetection device according to claim 1, wherein the semiconductor photodetection element further includes an electrode pad for wire bonding electrically connected to the photodetection region on the first surface, wherein
   the light absorption film is configured to expose at least a part of the electrode pad.

3. The photodetection device according to claim 1, wherein an optical thickness of the resonance layer is within a range of ±20% centered on an integer multiple of ¼ of the wavelength of the detection target light.

4. The photodetection device according to claim 1, wherein the photodetection region includes an avalanche photodiode or a p-n junction type photodiode.

5. The photodetection device according to claim 1, wherein the resonance layer mainly contains $SiO_2$.

6. A photodetection device comprising:
a semiconductor photodetection element including a semiconductor substrate having a first surface, and a second surface opposite to the first surface and on which detection target light is incident, and including a photodetection region on the first surface configured to generate a charge in an amount according to a light intensity of the detection target light, and a light absorption film provided on a region of at least a part of a region around a region obtained by projecting the photodetection region on the second surface in a direction opposite to an incident direction of the detection target light; and
a package having an optical window through which the detection target light passes, and configured to contain the semiconductor photodetection element, wherein
the light absorption film has a multi-layer structure including a light absorption layer, a resonance layer provided between the light absorption layer and the semiconductor substrate, and a reflection layer being a metal layer provided between the resonance layer and the semiconductor substrate, and
at a wavelength of the detection target light, a light transmittance inside the resonance layer is larger than a light transmittance inside the light absorption layer, and a light reflectance on a surface of the reflection layer is larger than a light reflectance on a surface of the resonance layer, and wherein
the light absorption layer mainly contains tungsten silicide.

7. The photodetection device according to claim 6, wherein an optical thickness of the resonance layer is within a range of ±20% centered on an integer multiple of ¼ of the wavelength of the detection target light.

8. The photodetection device according to claim 6, wherein the photodetection region includes an avalanche photodiode or a p-n junction type photodiode.

9. The photodetection device according to claim 6, wherein the resonance layer mainly contains $SiO_2$.

10. A photodetection device comprising:
a semiconductor photodetection element including a semiconductor substrate having a first surface on which detection target light is incident, and a second surface opposite to the first surface, and including a photodetection region on the first surface side configured to generate a charge in an amount according to a light intensity of the detection target light, and a light absorption film provided on a region of at least a part of a region around the photodetection region on the first surface; and
a package having an optical window through which the detection target light passes, and configured to contain the semiconductor photodetection element, wherein
the light absorption film has a multi-layer structure including a light absorption layer, a resonance layer provided between the light absorption layer and the semiconductor substrate, and a reflection layer being a metal layer provided between the resonance layer and the semiconductor substrate, and
at a wavelength of the detection target light, a light transmittance inside the resonance layer is larger than a light transmittance inside the light absorption layer, and a light reflectance on a surface of the reflection layer is larger than a light reflectance on a surface of the resonance layer, and wherein
the semiconductor photodetection element further includes an electrode pad for wire bonding electrically connected to the photodetection region on the first surface, and
the light absorption film is configured to cover at least a part of the electrode pad.

* * * * *